UNITED STATES PATENT OFFICE.

ERNST SIMONS, OF CASSEL, GERMANY.

METHOD OF PREPARING TUBERS FOR MANUFACTURE OF DOUGH OR FLOUR FOR BREAD AND BAKERS' WARES.

1,225,877. Specification of Letters Patent. Patented May 15, 1917.

No Drawing. Application filed September 22, 1915. Serial No. 52,130.

*To all whom it may concern:*

Be it known that I, ERNST SIMONS, a subject of the German Emperor, and a resident of Cassel, Germany, have invented a new and useful Method of Preparing Tubers for the Manufacture of Dough or Flour for Bread and Bakers' Wares, of which the following is a specification.

Tubers have been disintegrated by treating them with water or steam of a temperature of 100° C. but the result consisted not only in destroying the gluten, but also in rendering the diastase inactive and in destroying the vitamin. To preserve the two latter, tubers might be treated with water of a temperature of less than 100° C., for instance 75° or 85° C., but then valuable properties of tubers, *i. e.* the aromatic scents, would be lost, although they ought to be preserved in order to show clearly if the tubers be good. By means of the smell one ascertains whether there has been too strong a manuring of the soil on which the tubers are grown.

These scents would, in fact, become lost partly by way of the scum and slime, forming upon the mixture of the water and tubers and being removed in proper time, partly in and by the liquid, which cannot be completely made use of.

The drawbacks in question are fully obviated by employing steam of less than 100° C., for instance 85° C. This of course, must be done in a vacuum receptacle in which the pressure inherent with said temperature is kept uniform. To accelerate the process, substances adapted to act upon the cellulose of the husks or hulls and to soften or mollify the same may be employed in combination with the application of steam of reduced pressure. Besides the advantages already disclosed, my improved and novel method excels the previous methods also in the following points:

(1) The vitamin is not destroyed;
(2) The germinative faculty is preserved;
(3) The gluten is not destroyed and
(4) The aromatic cerealic scents are preserved also. It might be assumed that the scum and slime formed also under the partial vacuum also contain valuable nutritive salts, but this is, in fact, not the case. Suppose tubers are treated for at least 5 hours with steam of 85° C. under a partial vacuum at a pressure of 436.5 millimeters, the scum and slime being removed in proper time, the said products become so soft that they may be crushed without any difficulty. To prove that the above mentioned qualities, especially the germinative faculty, are preserved, the following test was performed: After a digestion of the last mentioned crushed product during two hours at 55° C. a solution is obtained which strongly reduces Fehling's solution and deviates the polarized ray of light to the right. Accordingly the diastase is obtained.

The thus prepared tubers are crushed and then used for making dough or they are dried in known manner and are then reduced to flour. During the drying the temperature employed may be raised to some extent but not so far as to produce noxious effects. If desired or preferred, oxygen may be admitted at the same time to improve the product.

To enable the steam to produce the desired effect where the products of tubers, especially potatoes are to be treated, such products must be dried before being subjected to the action of the steam. It is, however, advantageous to develop the steam out of the tubers, *i. e.* potatoes, themselves, for instance by letting a hot gas act upon them, the steam being then produced within the potatoes and acting as opening or disintegrating medium.

The flour produced from tubers treated in the before-described manner does not contain any bitter substances and may be used for feeding or baking purposes either alone or in combination with other kinds of flour. It has a fine yellowish color and is distinguished by this property from all other kinds of flour employed for bakery purposes. Also the bread produced from this flour or from a mixture of flours containing the flour in question shows the just mentioned color. If bleaching substances, such, for instance, as ozone, hydric peroxid, or the like, are employed during the opening or disintegrating of tubers, the flour has a somewhat lighter color; however, the tendency to get moldy or musty (which is chiefly caused by the flour taking up a rather large quantity of water during the baking operation) is greatly reduced.

A particularly well-tasting bread is obtained by mixing one part of rye malt dough with two parts of dough produced from flour made from tubers prepared according to the before described novel method, adding some yeast and salt to the mixed dough and baking the whole for from 12 to 13 hours in a tight oven under the influence of heat and steam.

Having now described my invention, what I desire to secure by Letters Patent of the United States is:

1. The method of preparing tubers for the manufacture of flour for bread and bakers' wares, consisting in subjecting said tubers to the action of steam of less than 100° C. in order to preserve the diastase, substantially as described.

2. The method of preparing tubers for the manufacture of flour for bread and bakers' wares, consisting in subjecting said tubers to the action of steam of less than 100° C. in order to preserve the diastase, and then drying and crushing said tubers, substantially as described.

3. The method of preparing tubers for the manufacture of flour for bread and bakers' wares, consisting in subjecting said tubers to the action of a hot gas having a temperature of less than 100° C., in order to produce steam within said tubers, said steam then acting as an opening or disintegrating medium.

In testimony whereof I have signed my name to this specification in the presence of two subscribing witnesses.

ERNST SIMONS.

Witnesses:
 ARNO HEDERICH,
 ELISE STRUTWOLF.